United States Patent [19]

Suchy

[11] 4,323,260

[45] Apr. 6, 1982

[54] FOLDING CHAIR AND CART

[76] Inventor: Adalbert W. Suchy, 118 Saratoga Ave., Yonkers, N.Y. 10705

[21] Appl. No.: 74,245

[22] Filed: Sep. 10, 1979

[51] Int. Cl.³ .............................................. B62B 1/02
[52] U.S. Cl. ................................ 280/47.25; 152/220; 180/9; 297/31; 297/59; 297/441; 297/457; 403/108; 403/109
[58] Field of Search ................ 280/30, 28.5, 647, 648, 280/650, 651, 652, 47.17, 47.24, 47.25, 654; 297/31, 59, 60, 457, 441; 403/108, 109; 152/220, 225 R, 225 C, 241, 242; 180/9

[56] References Cited

U.S. PATENT DOCUMENTS

| | | | |
|---|---|---|---|
| 1,414,897 | 5/1922 | Reilly | 297/31 |
| 1,455,617 | 5/1923 | Jackson | 403/108 |
| 1,951,754 | 3/1934 | Gilbert | 403/108 |
| 1,979,278 | 11/1934 | McMurtry | 297/457 |
| 2,305,072 | 12/1942 | Fetters | 280/28.5 |
| 2,441,471 | 5/1948 | Chaussé | 152/220 |
| 2,487,907 | 11/1949 | Turner | 297/457 |
| 2,573,915 | 11/1951 | Lewis | 297/31 |
| 2,587,176 | 2/1952 | Larson | 297/31 |
| 2,713,890 | 7/1955 | Mack | 297/31 |
| 3,677,571 | 7/1972 | Maturo | 280/654 |
| 3,758,128 | 9/1973 | Stenwall | 280/47.25 |
| 3,788,659 | 1/1974 | Allen | 280/654 |
| 3,997,213 | 12/1976 | Smith | 280/652 |

FOREIGN PATENT DOCUMENTS

| | | | |
|---|---|---|---|
| 226399 | 8/1962 | Austria | 280/47.25 |
| 1249330 | 11/1960 | France | 297/457 |
| 2230195 | 12/1974 | France | 280/650 |
| 229770 | 11/1943 | Switzerland | 280/652 |

*Primary Examiner*—John P. Silverstrim
*Attorney, Agent, or Firm*—Eugene E. Geoffrey, Jr.

[57] ABSTRACT

A folding chair and cart structure having an upright frame and a transverse member pivoted thereto, one end of the transverse frame forming a seat portion and the other end extending beyond the upright frame and carrying a pair of wheels, a sheet of canvas secured to the upright and transverse frames to form a seat and a track for removable engagement with the wheels. The structure functions as a cart by merely tilting the upright frame to a horizontal position and the entire structure is foldable into a compact unit for transport and storage.

8 Claims, 13 Drawing Figures

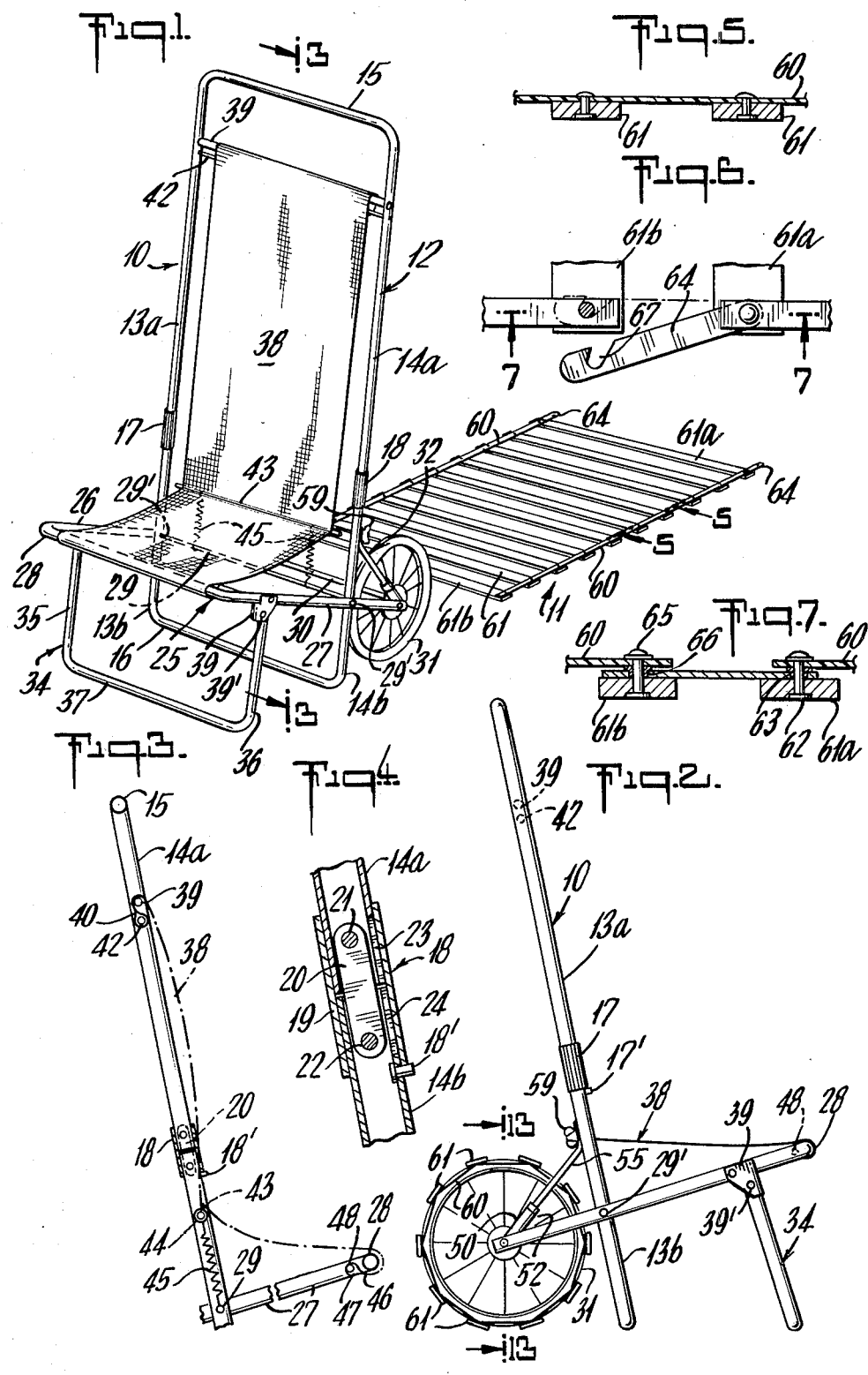

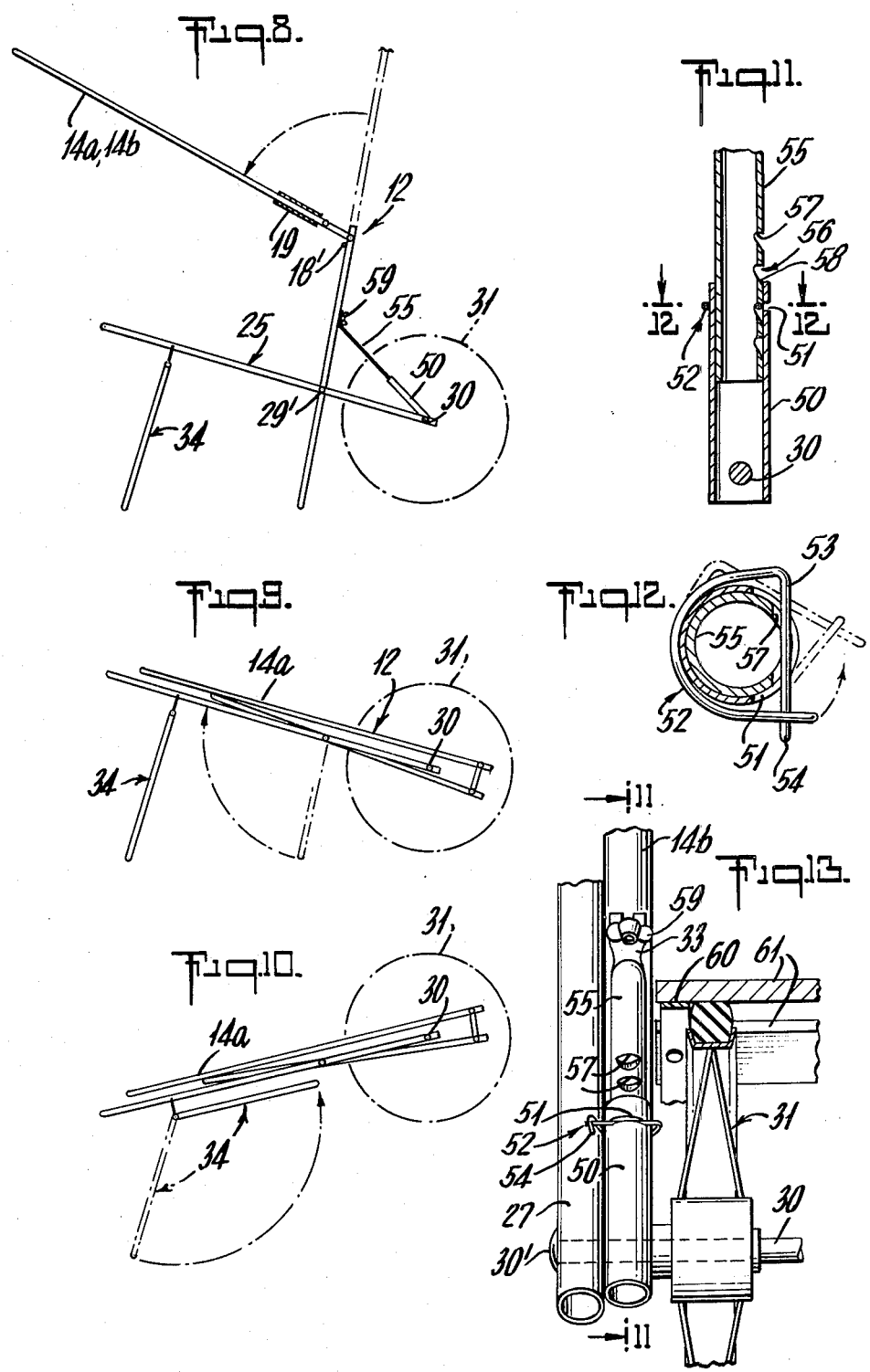

4,323,260

FOLDING CHAIR AND CART

This invention relates to a folding beach chair and cart and more specifically concerns a novel and improved chair and cart construction that is particularly useful for transporting articles over both hard and soft surfaces, is readily convertible from a cart to a chair and can be quickly and easily folded so that it can be readily stored or carried in the luggage compartment of a vehicle.

A wide variety of carts and folding chairs for use on the beach and other areas have been developed but known structures are either relatively complicated and expensive or limited to a single use such as a chair or a cart. Moreover, known carts are principally designed either for use on a hard surface or a soft sandy surface and are not readily convertible for utilization under either of the conditions.

This invention provides a novel and improved folding beach chair and cart embodying relatively simplified means to facilitate the utilization of the cart either on a hard surface or a soft sandy surface. Moreover, the cart in accordance with the invention can be readily and quickly folded into a compact unit to facilitate transport and is quickly and easily converted from a cart to a beach chair and vice versa.

Another object of the invention resides in the provision of a novel and improved folding beach chair and cart which is characterized by its simplicity of operation, relatively low cost and ease of adaption for utilization on hard and soft sandy surfaces.

Still another object of the invention resides in the provision of a novel and improved folding beach chair and cart which is capable of handling a relatively large quantity of equipment which would generally be utilized at the beach and at the same time provides a comfortable chair embodying means adjusting the angle of the back relative to the seat to accommodate the desires of the user.

Still another object of the invention resides in the provision of a novel and improved folding beach chair and cart.

The folding beach chair and cart in accordance with the invention comprises essentially an upright frame member having a transverse frame member pivoted thereto and extending on one side of the upright member for the attachment of wheels and from the opposing side of the upright member for provision of a seat. A front supporting element is provided on the transverse member to carry the weight of the occupant. This support is foldable in a position substantially parallel to the transverse member when the device is tilted so that the vertical member is in approximately a horizontal position for use as a cart. Novel and improved tracks are provided which are readily fixed in engagement with the wheels to facilitate utilization of the device as a cart when traversing soft or sandy soil. An adjustable support is provided between each wheel and the substantially vertical member to permit inclination of the vertical member relative to the seat in order to accommodate the desires of the user.

The above and other objects and advantages of the invention will become more apparent from the following description and accompanying drawings forming part of this application.

IN THE DRAWINGS

FIG. 1 is a perspective view of the folding beach chair and cart in accordance with the invention together with a track arranged for ready engagement with the wheels to facilitate utilization on soft or sandy surfaces;

FIG. 2 is a side elevation of the structure shown in FIG. 1 with a track in engagement with the wheels;

FIG. 3 is a fragmentary cross sectional view taken along the line 3—3 of FIG. 1 with parts broken away;

FIG. 4 is an enlarged cross sectional view of the latching sleeve and hinge means shown in FIG. 3;

FIG. 5 is a cross sectional view of FIG. 1 taken along the line 5—5 thereof;

FIG. 6 is an enlarged view of the latching means for securing the track to the wheels;

FIG. 7 is a cross sectional view of FIG. 6 taken along the line 7—7 thereof;

FIGS. 8, 9 and 10 are successive views showing the steps for folding the chair and cart structure as illustrated in FIG. 1;

FIG. 11 is a cross sectional view of bracing means for fixing the position of the upright member as illustrated in FIGS. 1 and 2 and taken along the line 11—11 of FIG. 13;

FIG. 12 is a cross sectional view of FIG. 11 taken along the line 12—12 thereof; and, FIG. 13 is a cross sectional view of FIG. 2 taken along the line 13—13 thereof.

The novel and improved folding beach chair and cart in accordance with the invention is generally illustrated in FIG. 1 and comprises the folding chair and cart generally denoted by the numeral 10 and a track 11 adapted to be fixed in engagement with the wheels. While the folding beach chair and cart is shown in a position for use as a beach chair, it will become evident as the description proceeds that the upright portion can be tilted backwardly to a horizontal position for use as a cart. At the same time, a front support for the chair can be folded.

As illustrated in the drawings, the folding beach chair and cart comprises an upright structure generally denoted by the numeral 12 which is of rectangular configuration having sectional side elements 13a, 13b, 14a and 14b. The upper ends of the side elements 14a and 14b are coupled by a transverse member 15 while the lower ends of the side elements 13a and 13b are coupled by a transverse element 16. The side elements 13a and 13b and the side elements 14a and 14b are coupled by sleeve and hinge connectors generally denoted by the numerals 17 and 18 and these connectors are shown more clearly in FIGS. 3 and 4. Since the connectors 17 and 18 are identical, only the connector 18 will be described.

The separate elements forming the structure 12 may be formed of tubular steel or other suitable material. The connectors 17 and 18 are used to facilitate the folding of the beach chair and cart and each connector is constructed as illustrated in FIGS. 3 and 4 which show the connector 18. The connector 18 comprises a sleeve 19 slidably engaging the element 14a. A link 20 is pivoted at 21 to the element 14a and at 22 to the element 14b. The front or right hand portion as illustrated in FIG. 4 of the elements 14a and 14b are provided with slots 23 and 24 respectively so that when the sleeve is in a raised position the upper portion of the structure 12 which includes the elements 13a, 14a and 15 can be readily folded forwardly. A stop 18' is carried by the element 14b to limit the lower most position of the sleeve 19.

A horizontally U-shaped structure generally denoted by the numeral 25 consists of side elements 26 and 27 and a forward bridging element 28 all formed of a tubular material. The side elements 26 and 27 are pivoted at 28, 28 to the upright elements 13b and 14b as illustrated in FIG. 1. For convenience, a transverse rod 29 extends between and in fact forms the pivots 28 so that the structure 25 can be moved angularly relative to the upright structure 12. The elements 26 and 27 of the structure 25 extend beyond the rectangular 12 and carry an axle 30 having wheels 31 mounted thereon. In this connection, the wheel 31 is rotatably carried by the axle 30 as shown more clearly in FIG. 13 and the axle extends through an opening in the rear portion of the element 14b (13b) and is held in place by any suitable fastening means such as a peened portion 30' as seen more clearly in FIG. 13. A pair of angularly positioned braces 32 engage the axle at one end as shown in FIG. 13 and the upper end has a spade connector 33 which is secured to the element 14b (13b). The details of braces 32 is shown in FIG. 13 which illustrates a brace being coupled to the axle 30 and to the element 14b. As will be described, both braces 32 are adjustable in length in order to change the position of the upright member 12 to suit the desires of the user as will be described.

In order to provide adequate support for the device when used as a beach chair, a U-shaped structure 34 having vertically disposed elements 35 and 36 and a transverse bottom element 37 is pivoted to the forward portion of the structure 25 by means of brackets 38 secured to the elements 26 and 27, of which one bracket 38 is shown in FIG. 1, and pivotally secured at 39 to the legs 35 and 36. In this way, the structure 34 can be folded to the rear when the device is used as a cart and when it is folded for transport. It is evident from the foregoing description that the diameter of the wheels 31, the position of the pivots 28 and the length of the side elements 35 and 36 of the structure 34 are all adjusted to provide a substantially three point support on each side of the device when used as a chair.

The canvas generally denoted by the numeral 38 is secured to the upper portion of the structure 12 by folding it about a transverse rod 39 secured to the upper portion of the elements 13a and 14a as illustrated in FIG. 1. The end of the canvas has a longitudinal seam 40 which forms a channel 41 for receiving a second transverse rod 42. The rod 42 is positioned in engagement with openings in the elements 13a and 14a at points just below the transverse rod 39. The lower portion of the canvas is also provided with a longitudinal seam 43 which forms a rearwardly extending loop carrying a transverse rod 44 as shown more clearly in FIG. 3. The upper ends of a pair of springs 45 extend through the loop formed by the seam 43 and secondly about the rod 44 and the lower ends of the springs 45 are securely fastened about the transverse rod 29. This holds the rear portion of the canvas firm. The forward portion of the canvas is wrapped around the transverse element 28 and is formed with a longitudinal seam 46 which provides a loop portion 47. A rod 48 extends through the loop portion 47 and engages openings on the inner sides of the elements 26 and 27 of the structure 25. In this way, the canvas is held securely in position and with the utilization of the loading of the springs 45 the canvas is held firmly and conforms to the user to form a comfortable seat.

The diagonally disposed brackets 32 are identical and one of these brackets is illustrated in FIGS. 11 through 13. Each bracket consists of a sleeve 50 pivotally carried by the axle 30 and adjoining the element 27 (26) of the structure 25. The sleeve has a transverse slot 51 which receives a semi-circular spring member 52 having a transverse portion 53 which lies within the slot 51. A hook portion 54 engages the free end of the transverse portion 53 to maintain the spring in engagement with the slot 51. A cylindrical member 55, in the form of either a rod or tube, slidably engages the tubular member 50 and has a plurality of transverse recesses or slots 56 each having a transverse upper surface 57 forming a shoulder and an inclined lower edge 58. The upper end of the member 55 carries the spade connector 33 which is secured to the element 14b (13b) by a wing-nut 59 threadably engaging a cooperating bolt carried by the element 14b as illustrated in FIG. 13. A similar bolt and wing-nut arrangement is carried by the element 13b.

With the foregoing arrangement, the back portion of the chair 12 can be readily raised to a vertical position merely by moving it upwardly since the transverse portion 53 of the spring 52 will merely slide over the inclined portions 58 of the slots 56. To incline the back 12, the spring 52 is merely rotated to the dotted position as shown in FIG. 12 whereupon the back 12 can be moved to an inclined position and the spring 52 rotated to the solid line position as illustrated in FIG. 12 to hold the back in the selected position.

When the structure illustrated in the drawings is used as a cart on hard surfaces, the wheels 31 may be utilized without the track 11. On soft surfaces such as sandy beaches and the like, the utilization of the track greatly facilitates maneuverability of the cart. The track is formed of two longitudinal strips 60 of flexible material and carry a plurality of transverse slats 61 of wood, plastic or other suitable material. The slats 61 have a length slightly greater than the distance between the outer surfaces of the wheels 31 as illustrated in FIG. 13. One end slat 61a is fastened to the strips 60 by a rivet 62 or other suitable fastening means with a spacer 63 therebetween. A hook 64 having an opening at one end surrounds the spacer so that when the slat 61a is riveted to the strips 60 the hook 64 will rotate freely. The slat 61b is fastened to the strips 60 in a similar manner by means of rivets 65 and spacers 66 to receive the slots 67 in the other end of the hooks 64.

With the foregoing arrangement, the device is rolled on to the track as illustrated in FIG. 1 with the wheels 31 between the strips 60. The track is then wrapped around the wheels and the hooks are positioned as illustrated in FIG. 7. Because of the thickness of the strips 60, they will engage the outer edges of the wheels 31 and thus retain the track in alignment with the wheels. In as much as the slots 67 in the hooks 64 are inclined, disengagement of the hooks is accomplished merely by applying pressure to the slats 61a and 61b to bring them closer together at which time the hooks will automatically disengage to permit removal of the track.

FIGS. 8, 9 and 10 illustrate the steps for folding the beach chair and cart in accordance with the invention. Initially the wing-nuts 59 are loosened to disengage the diagonal brackets 32 from the upright member 12. The sleeves 19 on the upright member 12 are then raised to expose the link 20 and slots 23 and 24 whereupon the upper portion of the member 12 can be folded downwardly as illustrated. The lower portion of the member 12 is then rotated counterclockwise about the pivot 28 to the position shown in FIG. 9 whereupon the member 34 is moved counterclockwise to the position as shown in FIG. 10. With this arrangement, the entire structure occupies a relatively small space and can be readily stored or carried by hand.

The novel and improved folding chair and cart in accordance with the invention provides a comfortable chair having an adjustable back for utilization at the beach and other areas and may be readily used as a cart for carrying beach and other equipment. In addition, by the simple application of a track assembly to the wheels the cart can be readily employed on soft sandy surfaces as well as hard surfaces. Furthermore, the entire structure can be compactly folded for storage.

While only one embodiment of the invention has been illustrated and described, it is apparent that alterations, changes and modifications can be made without departing from the true scope and spirit thereof.

What is claimed is:

1. A folding chair and cart structure comprising a substantially vertical rectangular frame having interconnected top, bottom and vertical elements, an inclined U-shaped member having rearwardly extending legs, means pivoting said member to said frame at points spaced from the ends of said legs of said member to points on said vertical frame spaced from the bottom thereof, wheels carried by and inside the ends of said legs, foldable support means pivoted solely to the forward portion of said U-shaped frame member and extending downwardly therefrom, means coupling each leg of the first said U-shaped member to said vertical frame by a longitudinally adjustable diagonally disposed bracket comprising adjustable telescoping portions with one portion removably secured to the vertical frame and the other portion pivotally secured to a leg of said U-shaped member to permit the vertical frame to be adjusted to any one of a plurality of inclined positions, and a sheet of flexible material secured at one end to the upper portion of said vertical frame and at the other end to the forward portion of the first said U-shaped member to form a seat, said structure functioning as a cart when said vertical frame is tilted to the horizontal position with the top of the frame functioning as a handle, said wheels being carried by an axle extending between the legs of the first said U-shaped member, said diagonally disposed brackets each comprising a first cylindrical portion having a plurality of notches therein, a second cylindrical portion having a transverse slot slidably engaging the first cylindrical portion and a rotatable U-shaped spring having a pair of legs and a substantially straight portion extending from the end of one leg of said U-shaped spring toward the other leg and a hook carried at the end of said other leg of said U-shaped spring and engaging said straight portion, said straight portion being disposed in said slot and engaging a selected notch, said spring means being rotatable to disengage and engage selected notches to adjust the length of the associated bracket.

2. A folding chair and cart structure according to claim 1 wherein said vertical frame elements each including unidirectional hinge means positioned above the U-shaped member and a cooperating sliding collar overlying said hinge means, whereby slidable displacement of said collars permits unidirectional angular displacement of one portion of said vertical frame relative to the other portion to enable the structure to be folded into a compact form upon disengagement of said adjustable brackets.

3. A folding chair and cart structure comprising a substantially vertical rectangular frame having interconnected top, bottom and vertical elements, an inclined U-shaped member having rearwardly extending legs, means pivoting said member to said frame at points spaced from the ends of said legs of said member to points on said vertical frame spaced from the bottom thereof, wheels carried by and inside the ends of said legs, foldable support means pivoted solely to the forward portion of said U-shaped frame member and extending downwardly therefrom, means coupling each leg of the first said U-shaped member to said vertical frame by a longitudinally adjustable diagonally disposed bracket comprising adjustable telescoping portions with one portion removably secured to the vertical frame and the other portion pivotally secured to a leg of said U-shaped member to permit the vertical frame to be adjusted to any one of a plurality of inclined positions, and a sheet of flexible material secured at one end to the upper portion of said vertical frame and at the other end to the forward portion of the first said U-shaped member to form a seat, said structure functioning as a cart when said vertical frame is tilted to the horizontal position with the top of the frame functioning as a handle, said vertical frame elements each including unidirectional hinge means positioned above the U-shaped member and a cooperating sliding collar overlying said hinge means, whereby slidable displacement of said collars permits unidirectional angular displacement of one portion of said vertical frame relative to the other portion to enable the structure to be folded into a compact form upon disengagement of said adjustable brackets, said wheels being carried by an axle extending between the legs of said first U-shaped member, said adjustable brackets each have one end engaging said axle and the other end removably attached to one of said vertical elements below said hinge means, the first said pivoting means comprising a transverse rod engaging openings in said frame and said member, and said flexible sheet extends downwardly from the upper portion of said vertical frame and in the plane of said frame to a line spaced from said rod and then forwardly to the forward portion of the first said U-shaped member and spring support means engaging and extending upwardly from said rod and engaging said sheet material along said line whereby said sheet material is maintained in a relatively taut configuration.

4. A folding chair and cart structure according to claim 3 including a track comprising a plurality of transverse slats secured to a pair of longitudinal members of flexible material removably secured about said wheels with the slats extending therebetween and said longitudinal members engaging a side surface of each wheel to maintain the track in alignment therewith.

5. A folding chair and cart structure according to claim 4 wherein releasable fastening means on the ends of said track maintain it in engagement with said wheels.

6. A folding chair and cart structure according to claim 5 wherein said fastening means includes hook-like means pivotally secured to one end of each longitudinal member, each of said hook-like means having a reversely formed slot therein and post means on the other end of each longitudinal member for engagement by said hook-like means to retain said track in engagement with said wheels.

7. A folding chair and cart structure comprising a substantially vertical rectangular frame having interconnected top, bottom and vertical elements, an inclined U-shaped member having rearwardly extending legs, means pivoting said member to said frame at points spaced from the ends of said legs of said member to points on said vertical frame spaced from the bottom thereof, wheels carried by and inside the ends of said legs, foldable support means pivoted solely to the forward portion of said U-shaped frame member and extending downwardly therefrom, means coupling each leg of the first said U-shaped member to said vertical frame by a longitudinally adjustable diagonally disposed bracket comprising adjustable telescoping portions with one portion removably secured to the vertical frame and the other portion pivotally secured to a leg of said U-shaped member to permit the vertical frame to be adjusted to any one of a plurality of inclined positions, and a sheet of flexible material secured at one end to the upper portion of said vertical frame and at the other end to the forward portion of the first said U-shaped member to form a seat, said structure functioning as a cart when said vertical frame is tilted to the horizontal position, with the top of the frame functioning as a handle a track comprising a plurality of transverse slats secured to a pair of longitudinal members of flexible material removably secured about said wheels with the slats extending therebetween and said longitudinal members engaging a side surface of each wheel to maintain the track in alignment therewith.

8. A telescoping structure comprising a first cylindrical portion having a plurality of notches therein, a second cylindrical portion having a transverse slot slidably engaging the first cylindrical portion and a rotatable U-shaped spring having a pair of legs and a substantially straight portion extending from the end of one leg of said U-shaped spring toward the other leg and a hook carried at the end of said other leg of said U-shaped spring and engaging said straight portion, said straight portion being disposed in said slot and engaging a selected notch, said spring means being rotatable to disengage and engage selected notches to adjust the length of the structure.

* * * * *